US008825809B2

(12) United States Patent
Soldan et al.

(10) Patent No.: US 8,825,809 B2
(45) Date of Patent: *Sep. 2, 2014

(54) ASSET RESOLVABLE BOOKMARKS

(75) Inventors: Eric R. Soldan, Saratoga, CA (US); Bradley R. Pettit, Los Gatos, CA (US)

(73) Assignee: Microsoft Corporation, Redmond, WA (US)

(*) Notice: Subject to any disclaimer, the term of this patent is extended or adjusted under 35 U.S.C. 154(b) by 36 days.

This patent is subject to a terminal disclaimer.

(21) Appl. No.: 12/783,406

(22) Filed: May 19, 2010

(65) Prior Publication Data

US 2011/0289135 A1 Nov. 24, 2011

(51) Int. Cl.
*G06F 15/16* (2006.01)
*H04N 21/81* (2011.01)
*H04N 21/442* (2011.01)
*H04N 21/858* (2011.01)
*G06Q 30/02* (2012.01)
*H04N 21/845* (2011.01)
*H04N 21/472* (2011.01)
*G06F 17/30* (2006.01)
*H04N 21/4788* (2011.01)
*G11B 27/10* (2006.01)
*H04N 21/475* (2011.01)

(52) U.S. Cl.
CPC ......... *G06Q 30/0277* (2013.01); *H04N 21/812* (2013.01); *H04N 21/44222* (2013.01); *H04N 21/858* (2013.01); *H04N 21/8455* (2013.01); *H04N 21/47214* (2013.01); *G06F 17/30884* (2013.01); *H04N 21/4788* (2013.01); *H04N 21/47217* (2013.01); *G11B 27/105* (2013.01); *H04N 21/4755* (2013.01)
USPC ............................. 709/219; 709/225; 709/231

(58) Field of Classification Search
None
See application file for complete search history.

(56) References Cited

U.S. PATENT DOCUMENTS

| 6,990,671 | B1 * | 1/2006 | Evans et al. ................... 719/318 |
| 7,100,053 | B1 * | 8/2006 | Brown et al. ................. 713/185 |
| 7,184,653 | B2 * | 2/2007 | Evans ........................... 386/244 |
| 7,320,137 | B1 * | 1/2008 | Novak et al. .................. 725/134 |
| 7,324,997 | B2 * | 1/2008 | Yamada ................................. 1/1 |
| 7,469,410 | B2 * | 12/2008 | Evans et al. .................... 719/328 |
| 7,631,336 | B2 | 12/2009 | Diaz Perez |
| 7,818,435 | B1 * | 10/2010 | Jellinek ......................... 709/229 |
| 8,051,081 | B2 * | 11/2011 | Shahraray et al. ............ 707/736 |
| 8,539,331 | B2 * | 9/2013 | Pettit et al. .................... 715/206 |
| 8,655,879 | B2 * | 2/2014 | Shahraray et al. ............ 707/736 |
| 2004/0015398 | A1 | 1/2004 | Hayward |

(Continued)

OTHER PUBLICATIONS

Erdogan, Engin., "An On-Demand Advertising Model for Interactive Television", Retreived at <<http://lcc.gatech.edu/ms_projects/eerdogan/enginerdogan_masters_designdoc.pdf>>, Apr. 2004, pp. 1-35.

(Continued)

*Primary Examiner* — Backhean Tiv
(74) *Attorney, Agent, or Firm* — Micah Goldsmith; Glen Johnson; Micky Minhas

(57) ABSTRACT

Asset resolvable bookmarks are described. In embodiments, a bookmark is received at a media content source from a client device. The bookmark corresponds to a media asset and includes an identifier of the media asset. Additional data can be added to the bookmark to generate an asset resolvable bookmark, where the additional data includes at least enough data from which a receiving client device can determine a media content source from which the media asset can be accessed for playback at the receiving client device.

20 Claims, 6 Drawing Sheets

(56) References Cited

U.S. PATENT DOCUMENTS

| | | | |
|---|---|---|---|
| 2005/0031303 A1* | 2/2005 | Park | 386/69 |
| 2005/0183119 A1* | 8/2005 | Hofrichter et al. | 725/46 |
| 2005/0210145 A1* | 9/2005 | Kim et al. | 709/231 |
| 2006/0130119 A1* | 6/2006 | Candelore et al. | 725/135 |
| 2007/0067217 A1* | 3/2007 | Schachter et al. | 705/14 |
| 2007/0067331 A1* | 3/2007 | Schachter et al. | 707/102 |
| 2007/0100988 A1 | 5/2007 | Johnson et al. | |
| 2007/0157252 A1 | 7/2007 | Perez | |
| 2007/0244903 A1* | 10/2007 | Ratliff et al. | 707/10 |
| 2008/0082673 A1* | 4/2008 | Dynin et al. | 709/228 |
| 2008/0114648 A1 | 5/2008 | Chen et al. | |
| 2008/0208803 A1* | 8/2008 | Becher et al. | 707/3 |
| 2009/0222849 A1* | 9/2009 | Peters | 725/28 |
| 2010/0042642 A1* | 2/2010 | Shahraray et al. | 707/102 |
| 2010/0115596 A1* | 5/2010 | Horozov et al. | 726/7 |
| 2010/0262710 A1* | 10/2010 | Khatib et al. | 709/231 |
| 2011/0093319 A1* | 4/2011 | Chow | 705/14.15 |
| 2011/0283175 A1* | 11/2011 | Pettit et al. | 715/208 |
| 2011/0283311 A1* | 11/2011 | Luong | 725/28 |
| 2011/0289135 A1* | 11/2011 | Soldan et al. | 709/203 |

OTHER PUBLICATIONS

Lekakos, et al., "An Integrated Approach to Interactive and Personalized TV Advertising", Retreived at <<http://www.di.unito.it/~liliana/UM01/lekakos.pdf>>, In Proceedings of Workshop on Personalization in Future TV, 2001, pp. 10.

Narasimhan, et al., "TV Clips: Using Social Bookmarking for Content Discovery in a Fragmented TV Ecosystem", Retreived at <<http://delivery.acm.org/10.1145/1660000/1658563/a13-narasimhan.pdf?key1=1658563&key2=4370592621&coll=GUIDE&dl=GUIDE&CFID=71834238&CFTOKEN=61983897>>, Mobile and Ubiquitous Multimedia, Proceedings of the 8th International Conference on Mobile and Ubiquitous Multimedia, Nov. 22-25, 2009, pp. 8.

"Foreign Office Action", Chinese Application No. 201110144156.3, (May 2, 2013), 14 pages.

"Foreign Office Action", Chinese Application No. 201110144156.3, Nov. 14, 2013, 18 Pages.

\* cited by examiner

US 8,825,809 B2

ASSET RESOLVABLE BOOKMARKS

BACKGROUND

Bookmarks can be used to identify a media asset, such as a television program or movie, and/or to identify a specific start position within the media asset to begin playback. When a bookmark is generated or created by a user at a client device, the information associated with the bookmark is generally limited to an identifier of the media asset and/or a start position within the media asset. Further, an identifier of a media asset may identify the media asset in only one media content system, and not in another. Accordingly, a bookmark may only be discernable by a client device that is implemented for use in the one media content system.

Media assets, such as videos and music, can be shared via a URL that is a selectable link to a particular media asset. For example, a URL to a video on an Internet-based service can be emailed as a link to a friend, or posted on a social network site. The email recipient, or a social network contact, can select the URL and be directed to the video for viewing. However, if the video has been taken down or moved to a different address, the URL link is no longer useful in locating the video for viewing. For many other media assets, there are rights and service issues to contend with as well. Even if a particular media asset can be located and accessed, it may not be selectable for playback by a user at a given time. Such media assets can include movies and recorded video, such as a DVR recording that can only be played back from the local device that contains the recording. A video-on-demand movie may have issues with both playback rights and purchase requirements that preclude playback of the movie for viewing.

SUMMARY

This summary is provided to introduce simplified concepts of asset resolvable bookmarks that are further described below in the Detailed Description. This summary is not intended to identify essential features of the claimed subject matter, nor is it intended for use in determining the scope of the claimed subject matter.

Asset resolvable bookmarks are described. In embodiments, a bookmark is received at a media content source from a client device. The bookmark corresponds to a media asset and includes an identifier of the media asset. Additional data can be added to the bookmark to generate an asset resolvable bookmark, where the additional data includes at least enough data from which a receiving client device can determine a media content source from which the media asset can be accessed for playback at the receiving client device.

In other embodiments, the asset resolvable bookmark is maintained at the media content service for portability to the receiving client device, which may be an additional client device associated with a user of the client device from which the bookmark is received, or may be an additional client device associated with a different user. The bookmark received from the client device can include a time offset into the media asset to identify a position where the receiving client device begins playback of the media asset. In embodiments, the additional data that is included in the asset resolvable bookmark includes any one or combination of a selectable link to access the media asset for playback, purchase information to purchase the media asset, subscription information to subscribe to the media content source from which the media asset can be accessed, a parental control level associated with the media asset, and/or advertisement information that initiates playback of an advertisement at the receiving client device that receives the asset resolvable bookmark.

BRIEF DESCRIPTION OF THE DRAWINGS

Embodiments of asset resolvable bookmarks are described with reference to the following drawings. The same numbers are used throughout the drawings to reference like features and components.

DETAILED DESCRIPTION

Asset resolvable bookmarks are described. In embodiments, a bookmark can be generated at a client device and include an identifier or reference that corresponds to a specific media asset, such as a television program or movie that is rendered for viewing at the client device. The bookmark is communicated to a media content service that then adds metadata associated with the media asset, as well as additional information, to the bookmark to create an asset resolvable bookmark. The additional information added to the asset resolvable bookmark includes at least enough information from which a receiving client device can determine a media content source from which the media asset can be accessed for playback. For example, a client device may receive an asset resolvable bookmark, and the client device can resolve or determine that the media asset is available for download and/or playback from the media content service or from another media content source.

In various embodiments, the information in an asset resolvable bookmark to determine or resolve access to a media asset can include a selectable playback link to tune and/or playback the media asset; a selectable source link to a media content source that may provide the media asset to a receiving client device; purchase information to initiate a purchase of the media asset; subscription information (e.g., a URL to a subscription page) to subscribe to a media content source that can provide the media asset to the receiving client device; and/or advertisement insertions to playback one or more advertisements for viewing before the media asset can be played back. In addition, an asset resolvable bookmark may include indications as to which advertisements have been played back for viewing if advertisement insertions are also included in the asset resolvable bookmark. An asset resolvable bookmark includes enough information that a client device can determine how and from where to obtain the media asset that corresponds to the bookmark.

While features and concepts of the described systems and methods for asset resolvable bookmarks can be implemented in any number of different environments, systems, and/or various configurations, embodiments of asset resolvable bookmarks are described in the context of the following example systems and environments.

Figure 1:
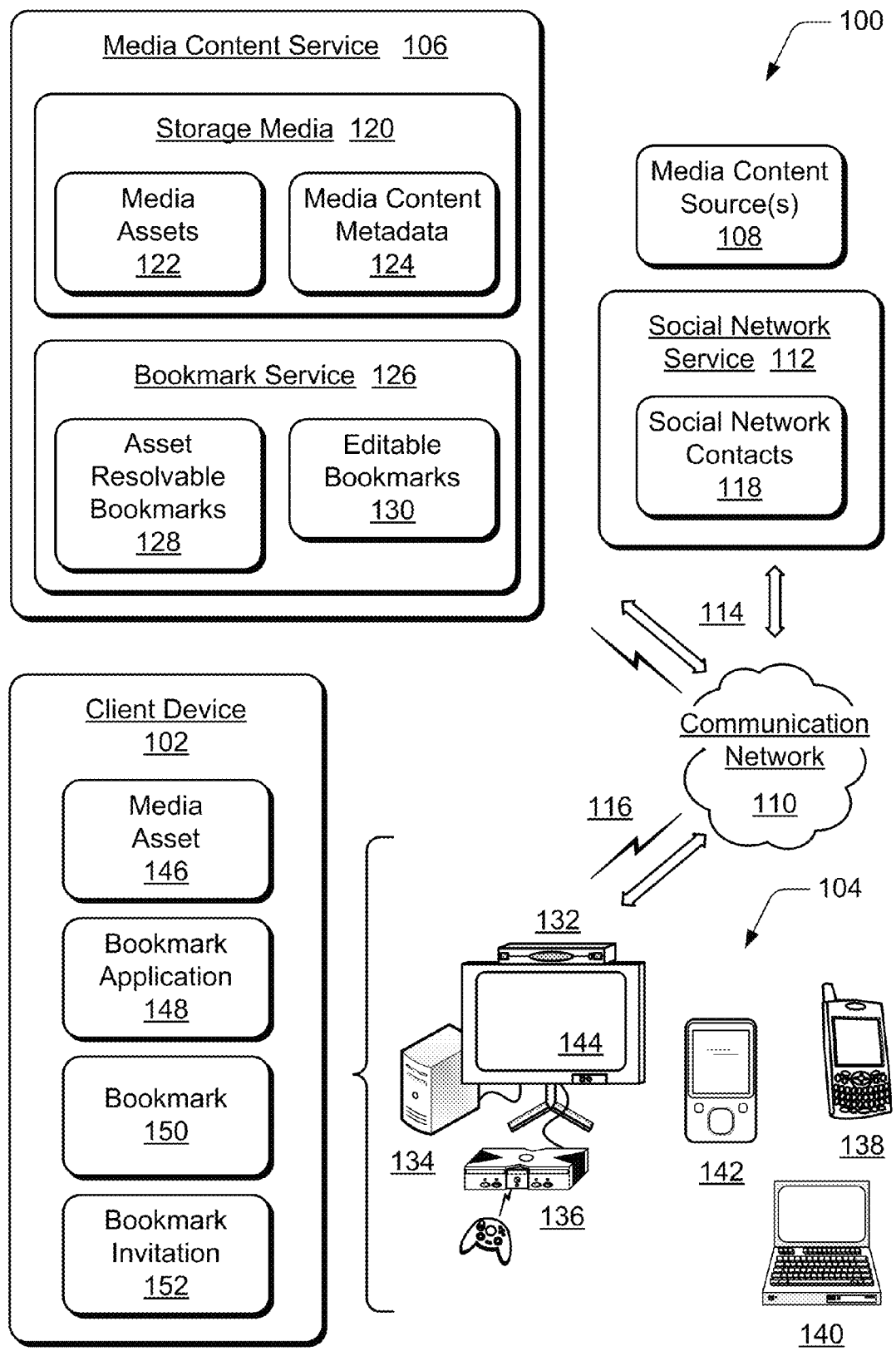
FIG. 1 illustrates an example system in which embodiments of asset resolvable bookmarks can be implemented.

FIG. 1 illustrates an example system 100 in which various embodiments of asset resolvable bookmarks can be implemented. The example system 100 includes a client device 102, which may be configured as any type of client device 104. Some of the various client devices 104 include wired and/or wireless devices, and may also be referred to as user devices and/or portable devices. The example system 100 also includes a media content service 106 and/or other media content sources 108 that communicate or otherwise provide media content and data to any number of the various client devices 104 via a communication network 110. The example system 100 also includes a social network service 112 that supports social networking by users of the various client devices.

The communication network 110 can be implemented to include a broadcast network, an IP-based network 114, and/or a wireless network 116 that facilitates media asset distribution and data communication between the media content service 106, the other media content sources 108, the social network service 112, and any number of the various client devices. The communication network 110 can also be implemented using any type of network topology and/or communication protocol, and can be represented or otherwise implemented as a combination of two or more networks. The communication network 110 may also include a mobile operator network that is managed by a communication service provider, such as a cell-phone provider and/or Internet service provider, to facilitate mobile data and/or voice communications for any type of a wireless device or mobile phone (e.g., cellular, VoIP, Wi-Fi, etc.).

The social network service 112 may be implemented as any type of social network site that provides for social network contacts 118 based on any one or combination of social groups, such as co-workers, friends, family, a group based on common interests, a group of unknown contacts that are linked based on some commonality, and so on. The social network contacts 118 can utilize the social network service 112 as a basis to permit sharing of media content, photos, blogs, updates, and the like. The social network service 112 may use a permissioning technique, such as a selected or allowed relationship, to permit or restrict access to content associated with a user account of the social network service. For example, a user of the client device 102 may have an associated user account with the social network service 112, and via the client device 102, the user can select and allow social network contacts of the user.

The media content service 106 can include media content servers to communicate, or otherwise distribute, media content and/or other data to any number of the various client devices. In this example system 100, the media content service 106 includes storage media 120 to store or otherwise maintain various media content and data, such as media assets 122 and media content metadata 124. The storage media 120 can be implemented as any type of memory and/or suitable electronic data storage. Additionally, the media content service 106 may be implemented as a subscription-based service from which any of the various client devices 104 can request media assets 122 to download and display for viewing, or otherwise render for playback. The media content service 106 manages the media asset distribution to the various client devices 104, such as when a request for a media asset 122 is received from a client device 104, and the media content service 106 communicates or provides data segments of the media asset to the client device.

The media assets 122 can include any type of audio, video, and/or image data received from any type of media content source or data source. As described throughout, media assets are media content, and media assets can include music (e.g., digital music files of songs), television programming, movies, on-demand media assets, interactive games, network-based applications, and any other audio, video, and/or image data (e.g., to include program guide data, user interface data, advertising content, closed captions data, content metadata, search results and/or recommendations, etc.). A media asset 122 may also include various display formats of the media asset, such as a highest quality display format (e.g., a highest quality, high-definition display format) to a lower quality display format (e.g., a lower quality, standard-definition display format), and any other quality of display format along a continuum between the two.

The media content metadata 124 can include any type of identifying criteria, descriptive information, and/or attributes associated with the media assets 122 that describes and/or categorizes the media assets. For example, metadata can include a media asset identifier, title, subject description, a date of production, artistic information, music compilations, and any other types of descriptive information about a particular media asset. Further, metadata can characterize a genre that describes a media asset, such as video content, as being an advertisement, a movie, a comedy show, a sporting event, a news program, a sitcom, a talk show, an action/adventure program, or as any number of other category descriptions.

In this example system 100, the media content service 106 includes a bookmark service 126 that can be implemented as computer-executable instructions and executed by one or more processors to implement the various embodiments described herein for asset resolvable bookmarks 128 and editable bookmarks 130. Examples of an asset resolvable bookmark and an editable bookmark are described below with reference to FIG. 2. Although asset resolvable bookmarks and editable bookmarks are illustrated and described as different types of bookmarks, it should be noted that an asset resolvable bookmark may be editable, and an editable bookmark may be asset resolvable. Generally, the descriptions of bookmarks described herein may be applicable to an asset resolvable bookmark, an editable bookmark, or a combination thereof.

The media content service 106 can also be implemented with any number and combination of differing components as further described with reference to the example device shown in FIG. 7. Additionally, any of the media content service 106, the social network service 112, and the bookmark service 126 can be provided as an independent service (e.g., on a separate server or by a third party service), or as one combined service.

In this example system 100, a client device 104 can be implemented as any one or combination of a television client device 132 (e.g., a television set-top box, a digital video recorder (DVR), etc.), a computer device 134, a gaming system 136, an appliance device, an electronic device, and/or as any other type of client device or user device that may be implemented to receive media content in any form of audio, video, and/or image data. The various client devices 104 can also include wireless devices implemented to receive and/or communicate wireless data, such as any one or combination of a mobile phone 138 (e.g., cellular, VoIP, WiFi, etc.), a portable computer device 140, a media device 142 (e.g., a personal media player, portable media player, etc.), and/or any other wireless device that can receive media content in any form of audio, video, and/or image data. A client system can include a respective client device and display device 144 that together render or playback any form of audio, video, and/or image media content and media assets. The display device 144 can be implemented as any type of a television, high definition television (HDTV), LCD, or similar display system.

Any of the various client devices 104 can be configured as the client device 102 and implemented with one or more processors, communication components, memory components, signal processing and control circuits, and a media content rendering system. Further, any of the client devices 104 can be implemented with any number and combination of differing components as further described with reference to the example device shown in FIG. 7. A client device may also be associated with a user (i.e., a person) and/or an entity that operates the device such that a client device describes logical devices that include users, software, and/or a combination of devices.

The example client device 102 can receive and playback a media asset 146 from the media content service 106 or from any other media content source 108. The client device 102 includes a bookmark application 148 that is implemented to generate a bookmark 150 when initiated by a user at the client device. A bookmark can be initiated or created as an identifier or reference that corresponds to a specific media asset, or segment thereof A bookmark can also optionally indicate start and/or end points that define a segment of the media asset. A user at the client device 102 can initiate the bookmark 150 being generated by the bookmark application 148, such as by pressing a bookmark selectable button or control on a remote control device. The user can then later request to view, play, or share the bookmark.

The bookmark 150 can be generated by the bookmark application 148 and include an identifier of the media asset 146, as well as a time offset into the media asset to identify a position where playback of the media asset begins. Alternatively or in addition, a bookmark may include both a start position in the media asset and an endpoint to specify a segment of the media asset for playback. The client device 102 can then communicate the bookmark 150 to the media content service 106. The bookmark service 126 can add metadata 124 that is associated with the media asset to the bookmark 150 and generate an editable bookmark 130. Alternatively or in addition, the bookmark service 126 can add additional data to the bookmark 150 and generate an asset resolvable bookmark 128. The media content service 106 maintains the asset resolvable bookmarks 128 and the editable bookmarks 130 for portability to any of the various client devices 104, which may be associated with the user of client device 102 and/or associated with different users. The media content service 106 can communicate an asset resolvable bookmark 128 and/or and editable bookmark 130 to any of the various client devices 104 (e.g., a receiving client device).

The additional data that may be added to the bookmark 150 to generate an asset resolvable bookmark 128 includes at least enough information from which a receiving client device can determine a media content source from which the media asset can be accessed for playback. For example, a client device 104 may receive an asset resolvable bookmark 128, and the client device 104 can resolve or determine that the media asset is available for download and/or playback from the media content service 106 or from another media content source 108. A user of the client device 102 may have a subscription to request and playback the media assets 122 from the media content service 106.

In one instance, the receiving client device 104 also has an associated subscription to the media content service 106, and when the asset resolvable bookmark 128 is received, can request the media asset for playback from the media content service. Alternatively, the client device 102 may receive the media asset from a pay-per-view service for playback of a paid-for movie that is associated with a subscription movie service. A user can then bookmark the movie and send the bookmark to a friend at a receiving client device 104 who is a subscriber to the particular subscription movie service. The receiving client device 104 can then just request and playback the media asset directly based on the subscription to the movie service.

Alternatively, the receiving client device 104 may not have an associated subscription to the media content service 106, and therefore can not begin playback of the media asset. In this instance, the asset resolvable bookmark 128 includes enough information that the receiving client device 104 can determine how and from where to access the media asset for playback. The information in the asset resolvable bookmark 128 to determine or resolve access to the media asset can include any one or combination of a selectable playback link to tune and/or playback the media asset; a selectable source link to a media content source that may provide the media asset to the receiving client device; purchase information to initiate a purchase of the media asset; and/or subscription information (e.g., a URL to a subscription page) to subscribe to a media content source that can provide the media asset to the receiving client device. In an embodiment, the media content service 106 may also include a resolution service that is implemented to determine or resolve access to the media asset for the receiving client device.

In implementations of an asset resolvable bookmark 128, a receiving client device 104 may be initiated to playback one or more advertisements for viewing before the media asset can be played back. The asset resolvable bookmark 128 may include advertisement insertions to playback one or more advertisements for viewing before the media asset can be played back. In addition, an asset resolvable bookmark may include indications as to which advertisements have been played back for viewing if advertisement insertions are also included in the asset resolvable bookmark. Alternatively or in addition, the media asset may be purchased, or the user of the receiving client device 104 subscribes to a media content service from which the media asset can be requested for playback.

In other embodiments, the media content service 106 may receive a bookmark invitation 152 from the client device 102. The bookmark invitation 152 is generated at the client device and is directed to one or more social network contacts 118 of the user of the client device 102. The bookmark service 126 at the media content service 106 can then communicate an editable bookmark 130 to receiving client devices 104 of the social network contacts that are identified by the bookmark invitation. For example, a user at client device 102 may initiate the bookmark invitation 152 to invite a friend, or friends (e.g., social network contacts 118), to watch a television program while the user of the client device also watches the television program. The media content service 106 then communicates the editable bookmark 130 to the respective receiving client devices 104 of the friends that are invited to watch the television program at the same time that the user watches the television program at client device 102. In this party mode embodiment, the friends can watch the television program together at the same time, as well as chat and comment about the television program.

In various embodiments, the editable bookmark 130 can be communicated to the receiving client devices 104 as a selectable link to the editable bookmark, which is maintained by the media content service 106. The editable bookmark 130 can be shared as the selectable link, or posted on a social network page that is associated with a social network contact 118 at the social network service 112. The selectable link may also be implemented to initiate playback of the media asset at a receiving client device 104, or direct a receiving client device 104 to the editable bookmark 130 at the media content service.

The bookmark service 126 can also be implemented to determine a delay offset that is a time duration from when the bookmark 150 is received from the client device 102 to when the media asset is initiated for playback at a receiving client device. The receiving client device 104 can then initiate playback of the media asset at the time offset plus the delay offset to playback the media asset approximately synchronous with playback of the media asset at the client device 102 from which the bookmark is received. For example, a user at the client device 102 can initiate the bookmark 150 being generated, and the bookmark includes a time offset into the media asset to identify a position where playback of the media asset begins according to the bookmark.

The user at the client device 102 can then initiate the bookmark invitation 152 to invite a friend to watch the media asset as the user of the client device 102 also watches the media asset. The media content service 106 communicates the bookmark (e.g., as an editable bookmark 130) to the respective receiving client device 104 that is associated with the invited friend. There may be a delay from when the bookmark 150 is generated to when the receiving client device 104 initiates playback of the media asset. This delay is the delay offset, or time duration delay, that is added to the original time offset into the media asset when the bookmark 150 is generated so that playback of the media asset at the client device 102 and the receiving client device 104 is approximately synchronous. As mentioned above, a bookmark may also include both a start position in the media asset and an endpoint to specify a segment of the media asset (e.g., a program snippet) for playback.

In embodiments, an editable bookmark can include any one or combination of metadata captured about a media asset when the bookmark is generated; data contributed to the bookmark from a social network contact; an update to the bookmark from the originator or from a social network contact; ratings of the media asset when a social network contact rates the media asset; a media asset image that may be a thumbnail image or poster art associated with the media asset; and/or other comments and annotations about the media asset when posted by a social network contact. The bookmark service 126 can update the editable bookmark 130 when additional data associated with the media asset is received at the media content service 106 from a social network contact 118 via a respective client device 104. The editable bookmark 130 can continue to be updated and annotated. For example, a user can add a caption about a scene or event in the media asset to the editable bookmark. An editable bookmark 130 becomes a collection of data, information, and viewer comments about the media asset that corresponds to the bookmark.

Figure 2:
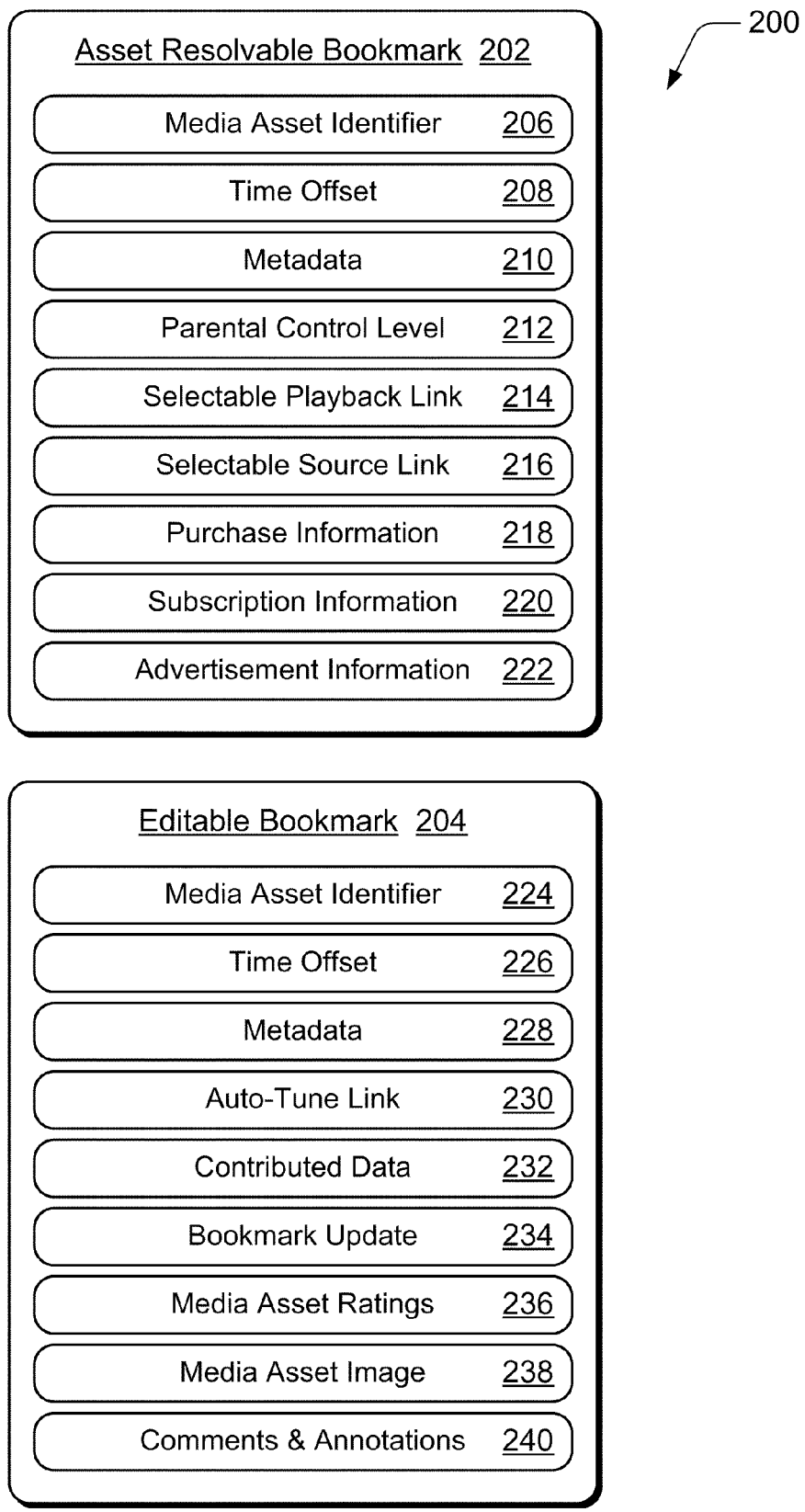
FIG. 2 illustrates examples of an editable bookmark and an asset resolvable bookmark in accordance with one or more embodiments.

FIG. 2 illustrates examples 200 of an asset resolvable bookmark 202 and an editable bookmark 204 in accordance with the various embodiments described herein. The asset resolvable bookmark 202 is an example of the asset resolvable bookmarks 128, and the editable bookmark 204 is an example of the editable bookmarks 130 described with reference to FIG. 1. As noted above, an asset resolvable bookmark may also be editable and include any of the various information described with reference to the editable bookmark 204. Similarly, an editable bookmark may also be asset resolvable and include any of the various information described with reference to the asset resolvable bookmark 202.

The asset resolvable bookmark 202 may include any one or combination of various information, such as an identifier 206 of the media asset that corresponds to the bookmark; a time offset 208 into the media asset; metadata 210 that is associated with the media asset; a parental control level 212 that is associated with the media asset; a selectable playback link 214 to tune and/or playback the media asset; a selectable source link 216 to a media content source that may provide the media asset to a receiving client device; purchase information 218 to initiate a purchase of the media asset; subscription information 220 to subscribe to a media content source that can provide the media asset to a receiving client device; and/or advertisement information 222, such as to initiate playback of an advertisement at a receiving client device before playback of the media asset begins.

The editable bookmark 204 may include any one or combination of various information, such as an identifier 224 of the media asset that corresponds to the bookmark; a time offset 226 into the media asset; metadata 228 that is associated with the media asset; an auto-tune link 230 that initiates the media asset for playback when received at a receiving client device; contributed data 232, such as data contributed to the bookmark from a social network contact; a bookmark update 234, such as an update to the bookmark from the originator or from a social network contact; ratings 236 of the media asset when a social network contact rates the media asset; a media asset image 238 that may be a thumbnail image or poster art associated with the media asset; and/or other comments and annotations 240 about the media asset when posted by a social network contact.

Figure 3:
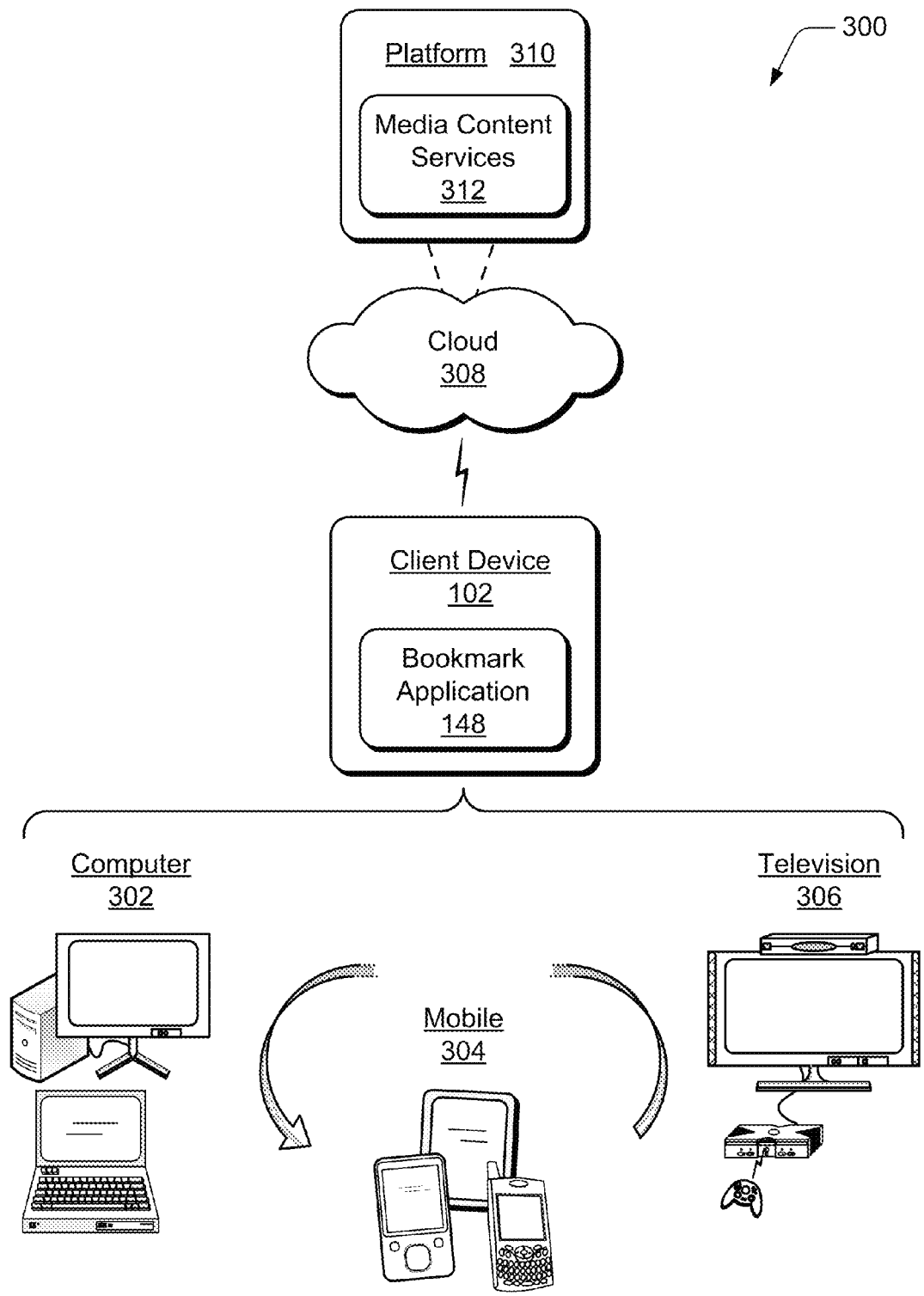
FIG. 3 illustrates an example system with multiple devices that can implement various embodiments of asset resolvable bookmarks for a seamless user experience in ubiquitous environments.

FIG. 3 illustrates an example system 300 that includes the client device 102 as described with reference to FIG. 1. The example system 300 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 300, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the client device 102 may assume a variety of different configurations, such as for computer 302, mobile 304, and television 306 uses. Each of these configurations includes devices that may have generally different constructs and capabilities, and thus the client device 102 may be configured according to one or more of the different device classes. For instance, the client device 102 may be implemented as the computer 302 class of a device that includes a personal computer, desktop computer, a multi-screen computer, laptop computer, netbook, and so on.

The client device 102 may also be implemented as the mobile 304 class of device that includes mobile devices, such as a mobile phone, portable music player, portable gaming device, a tablet computer, a multi-screen computer, and so on. The client device 102 may also be implemented as the television 306 class of device that includes devices having or connected to generally larger screens in casual viewing environments. These devices include televisions, set-top boxes, gaming consoles, and so on. The techniques described herein may be supported by these various configurations of the client device 102 and are not limited to the specific examples of asset resolvable bookmarks and/or editable bookmarks described herein.

The cloud 308 includes and/or is representative of a platform 310 for media content services 312. The platform 310 abstracts underlying functionality of hardware (e.g., servers) and software resources of the cloud 308. The media content services 312 may include applications and/or data that can be utilized while computer processing is executed on servers that are remote from the client device 102. For example, the media content services 312 may include the media content service 106, the social network service 112, and/or the bookmark service 126 as described with reference to FIG. 1. Media content services 312 can be provided as a service over the Internet and/or through a subscriber network, such as a cellular or WiFi network.

The platform 310 may abstract resources and functions to connect the client device 102 with other computing devices. The platform 310 may also serve to abstract scaling of resources to provide a corresponding level of scale to encountered demand for the media content services 312 that are implemented via the platform 310. Accordingly, in an interconnected device embodiment, implementation of functionality of the bookmark application 148 may be distributed throughout the system 300. For example, the bookmark application 148 may be implemented in part on the client device 102 as well as via the platform 310 that abstracts the functionality of the cloud 308.

Example methods 400, 500, and 600 are described with reference to respective FIGS. 4, 5, and 6 in accordance with one or more embodiments of asset resolvable bookmarks. Generally, any of the functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable memory devices, both local and/or remote to a computer processor. The methods may also be practiced in a distributed computing environment by multiple computer devices. Further, the features described herein are platform-independent and can be implemented on a variety of computing platforms having a variety of processors.

Figure 4:
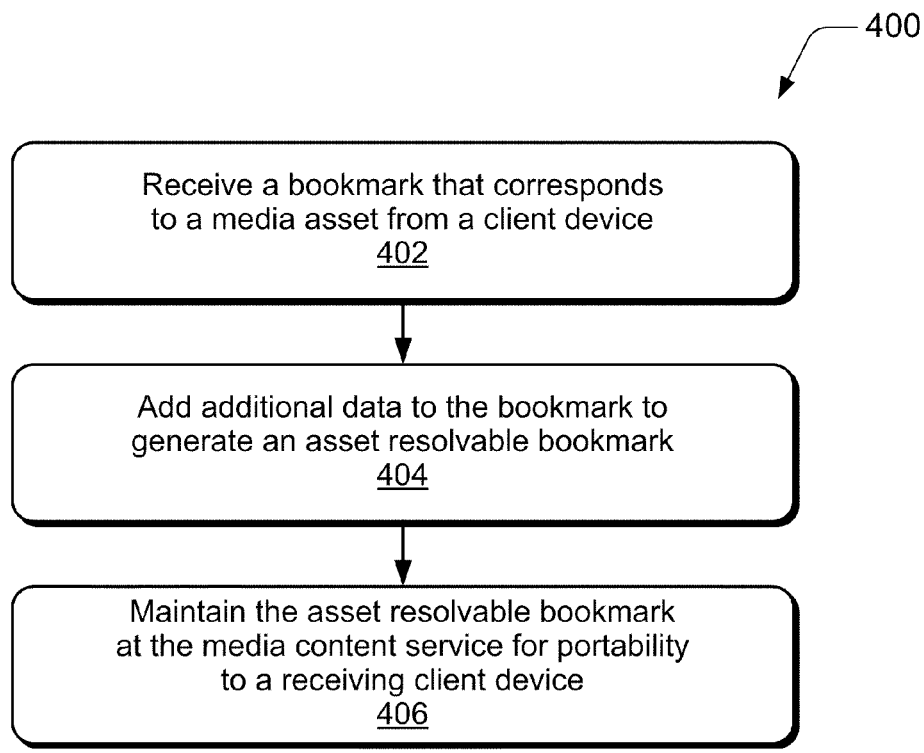
FIG. 4 illustrates example method(s) of asset resolvable bookmarks in accordance with one or more embodiments.

FIG. 4 illustrates example method(s) 400 of asset resolvable bookmarks, and is described with reference to a media content service. The order in which the method blocks are described are not intended to be construed as a limitation, and any number of the described method blocks can be combined in any order to implement a method, or an alternate method.

At block 402, a bookmark that corresponds to a media asset is received at a media content service from a client device. For example, the media content service 106 receives the bookmark 150 from client device 102, and the bookmark includes an identifier of the media asset 146 and/or a time offset into the media asset to identify a position where a receiving client device begins playback of the media asset.

At block 404, additional data is added to the bookmark to generate an asset resolvable bookmark. For example, the bookmark service 126 at the media content service 106 adds additional data to the bookmark 150 to generate an asset resolvable bookmark 128. The additional data added to create the asset resolvable bookmark includes at least enough data from which a receiving client device can determine a media content source from which the media asset can be accessed for playback at the receiving client device. For example, the media content source may be a different source for the media asset than the media content service. In embodiments, an asset resolvable bookmark 128 includes any one or combination of a selectable link to access the media asset for playback, purchase information to purchase the media asset, subscription information to subscribe to the media content source from which the media asset can be accessed, a parental control level associated with the media asset, and/or advertisement information that initiates playback of an advertisement at the receiving client device that receives the asset resolvable bookmark.

At block 406, the asset resolvable bookmark is maintained at the media content service for portability to a receiving client device. For example, the media content service 106 maintains the asset resolvable bookmarks 128 for portability to a receiving client device 104, such as an additional client device associated with a user of the client device 102, or an additional client device associated with a different user.

Figure 5:
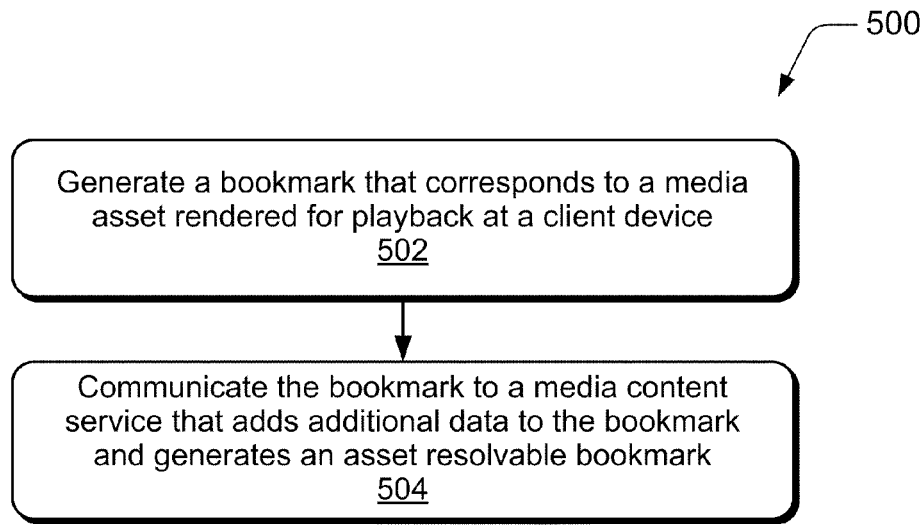
FIG. 5 illustrates additional example method(s) of asset resolvable bookmarks in accordance with one or more embodiments.

FIG. 5 illustrates example method(s) 500 of asset resolvable bookmarks, and is described with reference to a client device. The order in which the method blocks are described are not intended to be construed as a limitation, and any number of the described method blocks can be combined in any order to implement a method, or an alternate method.

At block 502, a bookmark is generated that corresponds to a media asset rendered for playback at a client device. For example, the bookmark application 148 at the client device 102 generates the bookmark 150 that corresponds to the media asset 146 which may be rendered for playback at the client device. The bookmark includes an identifier of the media asset and/or a time offset into the media asset to identify a position where a receiving client device begins playback of the media asset.

At block 504, the bookmark is communicated to a media content service that adds additional data to the bookmark and generates an asset resolvable bookmark. For example, the client device 102 communicates the bookmark 150 to the media content service 106 where the bookmark service 126 adds the additional data to create an asset resolvable bookmark 128 that includes at least enough data from which a receiving client device can determine a media content source from which the media asset can be accessed for playback at the receiving client device.

Figure 6:
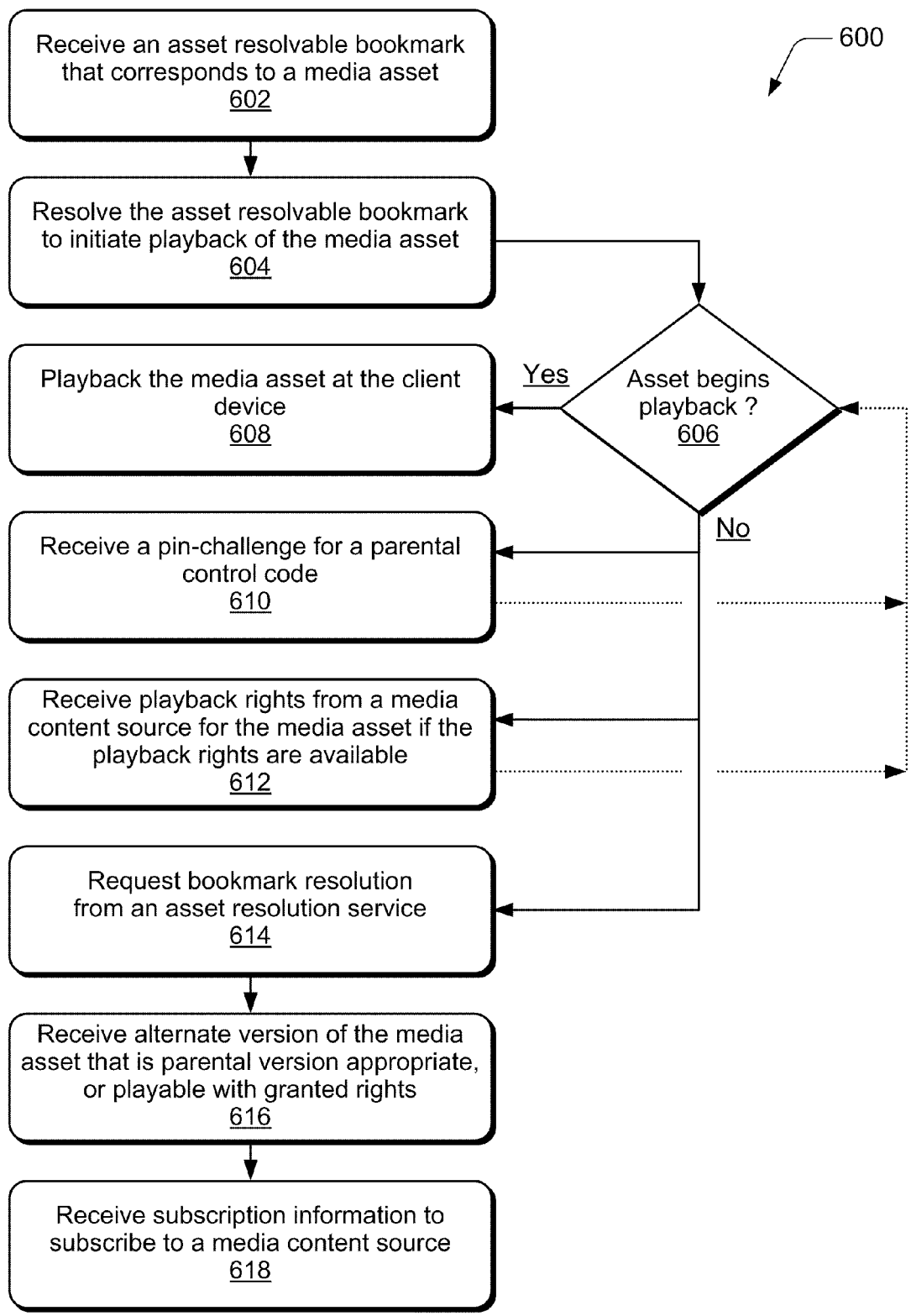
FIG. 6 illustrates additional example method(s) of asset resolvable bookmarks in accordance with one or more embodiments.

FIG. 6 illustrates example method(s) 600 of asset resolvable bookmarks, and is described with reference to a receiving client device. The order in which the method blocks are described are not intended to be construed as a limitation, and any number of the described method blocks can be combined in any order to implement a method, or an alternate method.

At block 602, an asset resolvable bookmark that corresponds to a media asset is received. For example, a client device 104 (e.g., a receiving client device) receives an asset resolvable bookmark from the bookmark service 126 at the media content service 106. At block 604, the asset resolvable bookmark is resolved to initiate playback of the media asset. For example, the receiving client device 104 resolves the asset resolvable bookmark to playback the media asset that corresponds to the bookmark.

At block 606, a determination is made as to whether the media asset begins playback at the receiving client device, and if it does (i.e., "yes" from block 606), then at block 608, the media asset is played back at the client device. The media asset can be played back starting from the time offset (e.g., a resume point), or from the beginning of the media asset. If the media asset does not begin playback (i.e., "no" from block 606), then at block 610, a pin-challenge for a parental control code is received. For example, a user at the receiving client device 104 may be challenged to enter a pin (personal identification number) before the media asset can playback due to parental control settings.

At block 606 again, a determination is made as to whether the media asset begins playback at the receiving client device after the parental code is received, and if it does (i.e., "yes" from block 606), then at block 608, the media asset is played back at the client device. If the media asset does not begin playback when the parental control code is entered (i.e., "no" from block 606), then at block 612, playback rights are received from a media content source for the media asset if the playback rights are available. For example, the media content service 106 may provide the playback rights to playback the media asset at the receiving client device when requested.

At block 606 again, a determination is made as to whether the media asset begins playback at the receiving client device if the playback rights are received, and if it does (i.e., "yes" from block 606), then at block 608, the media asset is played back at the client device. If the media asset does not begin playback due to lack of playback rights (i.e., "no" from block 606), then at block 614, bookmark resolution is requested from an asset resolution service. For example, the media content service 106 may include an asset resolution service, and the receiving client device 104 requests bookmark resolution from the asset resolution service.

At block 616, an alternate version of the media asset is received that is one of parental version appropriate for playback at the client device, or is playable with granted rights. For example, the receiving client device 104 receives, from the media content service 106, a different version of the media asset that is parental version appropriate for playback at the client device and/or playable with granted rights. Alternatively at block 618, subscription information is received to subscribe to the media content source from which the media asset is available. For example, the receiving client device 104 receives subscription information to subscribe to one or more media content sources from which the media asset is available.

Figure 7:
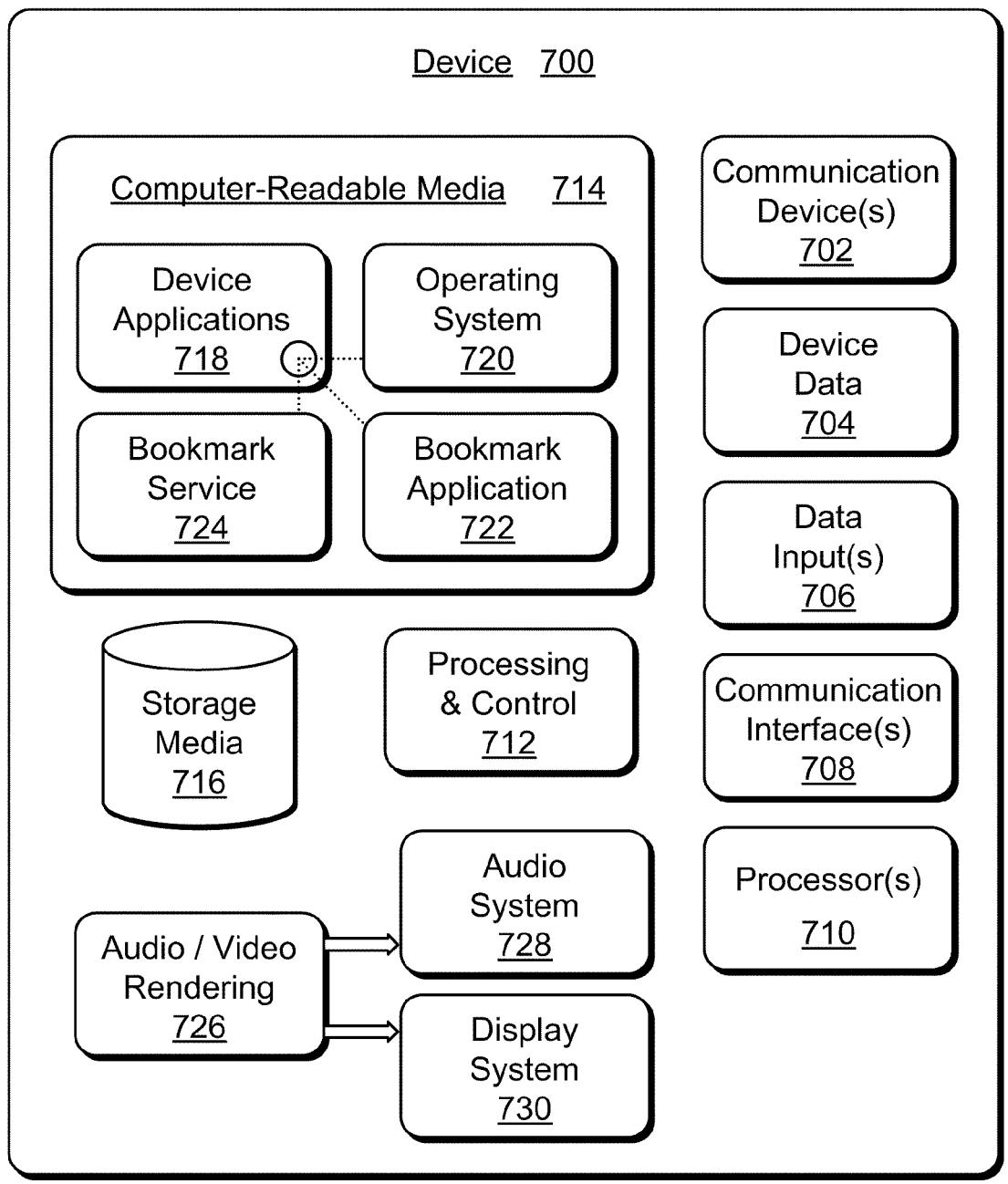
FIG. 7 illustrates various components of an example device that can implement embodiments of asset resolvable bookmarks.

FIG. 7 illustrates various components of an example device 700 that can be implemented as any type of portable and/or computing device as described with reference to the previous FIGS. 1-6 to implement embodiments of asset resolvable bookmarks. In embodiments, device 700 can be implemented as any one or combination of a wired and/or wireless device, as any form of television client device (e.g., television set-top box, digital video recorder (DVR), etc.), consumer device, computer device, server device, portable computer device, user device, communication device, video processing and/or rendering device, appliance device, gaming device, electronic device, and/or as any other type of device. Device 700 may also be associated with a user (i.e., a person) and/or an entity that operates the device such that a device describes logical devices that include users, software, firmware, and/or a combination of devices.

Device 700 includes communication devices 702 that enable wired and/or wireless communication of device data 704 (e.g., received data, data that is being received, data scheduled for broadcast, data packets of the data, etc.). The device data 704 or other device content can include configuration settings of the device, media content stored on the device, and/or information associated with a user of the device. Media content stored on device 700 can include any type of audio, video, and/or image data. Device 700 includes one or more data inputs 706 via which any type of data, media content, and/or inputs can be received, such as user-selectable inputs, messages, music, television media content, recorded video content, and any other type of audio, video, and/or image data received from any content and/or data source.

Device 700 also includes communication interfaces 708 that can be implemented as any one or more of a serial and/or parallel interface, a wireless interface, any type of network interface, a modem, and as any other type of communication interface. The communication interfaces 708 provide a connection and/or communication links between device 700 and a communication network by which other electronic, computing, and communication devices communicate data with device 700.

Device 700 includes one or more processors 710 (e.g., any of microprocessors, controllers, and the like) which process various computer-executable instructions to control the operation of device 700 and to implement embodiments of asset resolvable bookmarks. Alternatively or in addition, device 700 can be implemented with any one or combination of hardware, firmware, or fixed logic circuitry that is implemented in connection with processing and control circuits which are generally identified at 712. Although not shown, device 700 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 700 also includes computer-readable storage media 714, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 700 can also include a mass storage media device 716.

Computer-readable storage media 714 provides data storage mechanisms to store the device data 704, as well as various device applications 718 and any other types of information and/or data related to operational aspects of device 700. For example, an operating system 720 can be maintained as a computer application with the computer-readable storage media 714 and executed on processors 710. The device applications 718 may include a device manager, such as any form of a control application, software application, signal processing and control module, code that is native to a particular device, a hardware abstraction layer for a particular device, and so on.

The device applications 718 also include any system components or modules to implement embodiments of asset resolvable bookmarks. In this example, the device applications 718 can include a bookmark application 722, such as when device 700 is implemented as a client device. Alternatively or in addition, the device applications 718 can include a bookmark service 724, such as when device 700 is implemented as a media content service. The bookmark application 722 and the bookmark service 724 are shown as software modules and/or computer applications. Alternatively or in addition, the bookmark application 722 and/or the bookmark service 724 can be implemented as hardware, software, firmware, or any combination thereof.

Device 700 also includes an audio and/or video rendering system 726 that generates and provides audio data to an audio system 728 and/or generates and provides display data to a display system 730. The audio system 728 and/or the display system 730 can include any devices that process, display, and/or otherwise render audio, display, and image data. Display data and audio signals can be communicated from device 700 to an audio device and/or to a display device via an RF (radio frequency) link, S-video link, composite video link, component video link, DVI (digital video interface), analog audio connection, or other similar communication link. In an embodiment, the audio system 728 and/or the display system 730 are implemented as external components to device 700. Alternatively, the audio system 728 and/or the display system 730 are implemented as integrated components of example device 700.

Although embodiments of asset resolvable bookmarks have been described in language specific to features and/or methods, it is to be understood that the subject of the appended claims is not necessarily limited to the specific features or methods described. Rather, the specific features and methods are disclosed as example implementations of asset resolvable bookmarks.

The invention claimed is:

1. A computer-implemented method, comprising:
receiving a bookmark from a client device at a media content service, the bookmark corresponding to a media asset and including at least an identifier of the media asset;
adding, at the media content service, additional data to the bookmark to generate an asset resolvable bookmark, the additional data including source information from which a receiving client device can determine a media content source from which the media asset can be accessed for playback at the receiving client device; and
determining a delay offset that is a time duration from when the bookmark is received from the client device to when the media asset is initiated for playback at the receiving client device, the delay offset being configured to enable the receiving client device to initiate playback of the media asset approximately synchronous with playback of the media asset at the client device.

2. A computer-implemented method as recited in claim 1, wherein the media content source is a different source for the media asset than the media content service.

3. A computer-implemented method as recited in claim 1, further comprising maintaining the asset resolvable bookmark at the media content service for portability to the receiving client device, which is at least one of an additional client device associated with a user of the client device, or an additional client device associated with a different user.

4. A computer-implemented method as recited in claim 1, wherein the bookmark received from the client device includes a time offset into the media asset to identify a position where the receiving client device begins playback of the media asset.

5. A computer-implemented method as recited in claim 1, wherein the additional data includes at least one of:
a selectable link to access the media asset for playback;
purchase information to purchase the media asset; or
subscription information to subscribe to the media content source from which the media asset can be accessed.

6. A computer-implemented method as recited in claim 1, wherein the additional data includes a parental control level associated with the media asset.

7. A computer-implemented method as recited in claim 1, wherein the additional data includes advertisement information that initiates playback of an advertisement at the receiving client device.

8. A computer-implemented method, comprising:
generating a bookmark that corresponds to a media asset rendered for playback at a client device, the bookmark including at least an identifier of the media asset; and
communicating the bookmark to a media content service that adds additional data to the bookmark and generates an asset resolvable bookmark, the additional data including source information from which a receiving client device can determine a media content source from which the media asset can be accessed for playback at the receiving client device, the additional data further including a delay offset that is a time duration from when the bookmark is communicated to the media content service to when the media asset is initiated for playback at the receiving client device, the delay offset configured to enable the receiving client device to initiate playback approximately synchronous with playback of the media asset at the client device.

9. A computer-implemented method as recited in claim 8, wherein the media content source is a different source for the media asset than the media content service.

10. A computer-implemented method as recited in claim 8, wherein the bookmark is generated at the client device to include a time offset into the media asset to identify a position where the receiving client device begins playback of the media asset.

11. A computer-implemented method as recited in claim 8, wherein the additional data includes at least one of:
a selectable link to access the media asset for playback;
purchase information to purchase the media asset; or
subscription information to subscribe to the media content source from which the media asset can be accessed.

12. A computer-implemented method as recited in claim 8, wherein the additional data includes a parental control level associated with the media asset.

13. A computer-implemented method as recited in claim 8, wherein the additional data includes advertisement information that initiates playback of an advertisement at the receiving client device.

14. A system, comprising:
a media content service configured to receive a bookmark from a client device, the bookmark corresponding to a media asset and including at least an identifier of the media asset, the media content service including at least a memory and a processor to implement a bookmark service and a resolution service;

the bookmark service configured to add additional data to the bookmark and generate an asset resolvable bookmark, the additional data including data from which a receiving client device can determine a media content source from which the media asset can be accessed for playback at the receiving client device, the additional data further including a delay offset comprising a time duration from when the bookmark is received from the client device to when the media asset is initiated for playback at the receiving client device, the delay offset configured to enable the receiving client device to initiate playback approximately synchronous with playback of the media asset at the client device;

the resolution service configured to:
  determine that the receiving client device lacks playback rights to access the media asset from the media content source; and
  responsive to a determination that the receiving client device lacks the playback rights, provide an alternate version of the media asset that is one of parental version appropriate or playable with granted rights.

15. A system as recited in claim 14, wherein the media content source is a different source for the media asset than the media content service.

16. A system as recited in claim 14, wherein the media content service is further configured to maintain the asset resolvable bookmark for portability to the receiving client device, which is at least one of an additional client device associated with a user of the client device, or an additional client device associated with a different user.

17. A system as recited in claim 14, wherein the bookmark received from the client device includes a time offset into the media asset to identify a position where the receiving client device begins playback of the media asset.

18. A system as recited in claim 14, wherein the additional data includes at least one of:
  a selectable link to access the media asset for playback;
  purchase information to purchase the media asset; or
  subscription information to subscribe to the media content source from which the media asset can be accessed.

19. A system as recited in claim 14, wherein the additional data includes a parental control level associated with the media asset.

20. A system as recited in claim 14, wherein the additional data includes advertisement information that initiates playback of an advertisement at the receiving client device.

* * * * *